Jan. 9, 1940. R. D. COCHRAN 2,186,281
POPPING CORK
Filed March 3, 1938
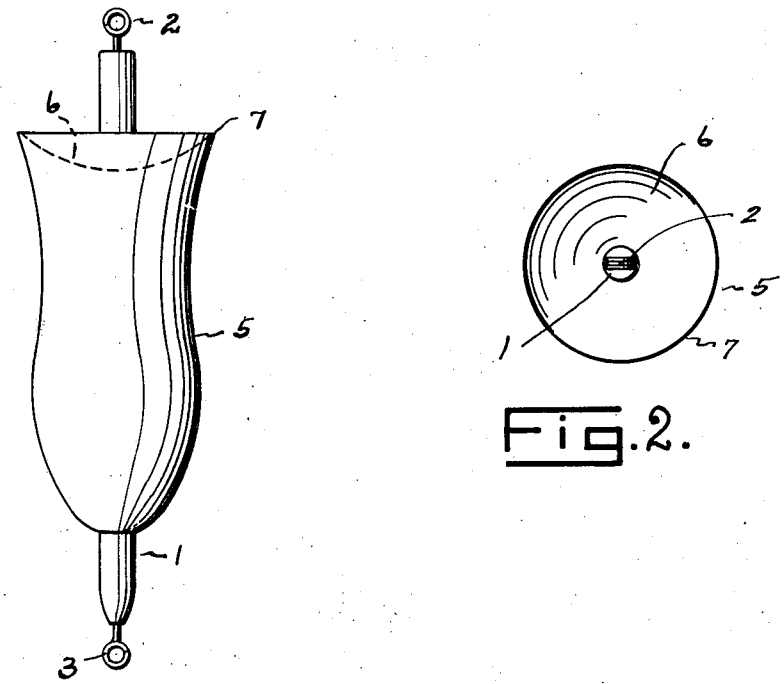
Fig. 1.
Fig. 2.
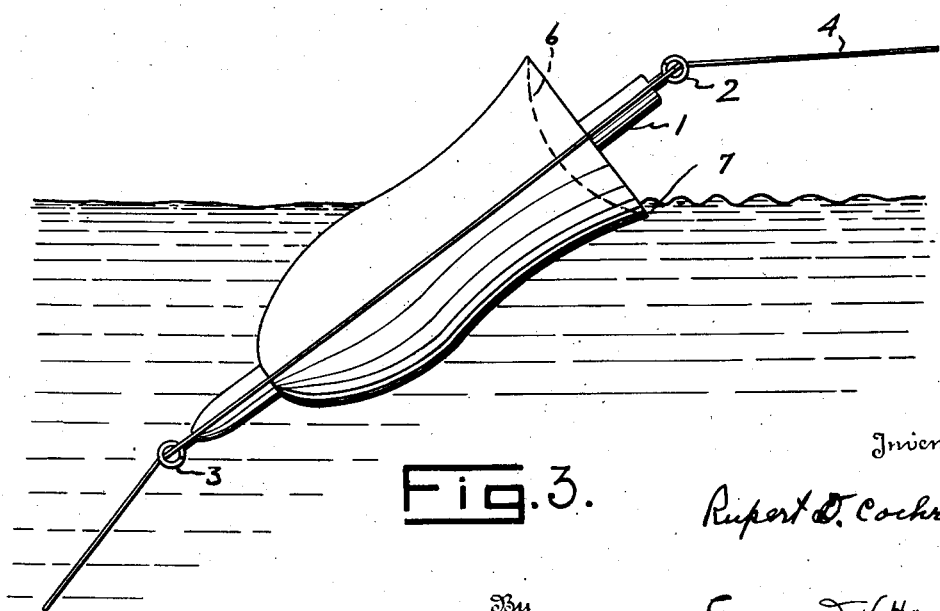
Fig. 3.
Inventor
Rupert D. Cochran
By
Edward V. Hardway
Attorney Patented Jan. 9, 1940

2,186,281

UNITED STATES PATENT OFFICE 2,186,281

POPPING CORK

Rupert D. Cochran, Houston, Tex.

Application March 3, 1938, Serial No. 193,701

3 Claims. (Cl. 43—49)

This invention relates to a popping cork, or float.

An object of the invention is to provide a float of the character described for use on fishing lines and which will tend to remain at the same location while fishing.

Another object of the invention is to provide a float of the character described which is so shaped as to cause an unusual ripple or agitation at the surface of the water when the line is jerked.

With the above and other objects in view, the invention has particular relation to certain novel features of construction, and use, an example of which is given in this specification and illustrated in the accompanying drawing, wherein:

Figure 1 shows a side view of the cork or float in vertical position.

Figure 2 shops a top plan view, and

Figure 3 shows a side view of the cork or float as attached to a fishing line shown in the position it will occupy in response to a jerk on the line.

Referring now more particularly to the drawing wherein like numerals of reference designate the same parts in each of the figures, the numeral 1 designates the stem which has the clamp eyes 2, 3 on the respective ends thereof to receive and clamp the line 4.

On the stem is the float 5. The lower end of the float is oval, as shown, and in cross section the float is preferably circular in form. This float is preferably formed of cork or similar light material.

The upper end of the float is flared or bell-shaped and has the concavity 6, thus providing an annular free edge 7 around the upper end of the float.

Normally the float will assume an upright position in the water caused by the weight of the hooks and sinker on the line beneath, and the upper end of the float will normally stand some distance above the surface of the water on account of the buoyancy of it.

In fishing with a rod and reel the hook is cast out from the location of the fisherman as far as possible and it is desirable that it remain in its location as long as practicable. It is also necessary that the line be intermittently jerked to cause the surface of the water to ripple to attract the fish. When the type of float herein described is employed, upon jerking the line, the edge 7 will engage the surface of the water so as to retard the movement of the float from its desired location so that it will not be necessary to cast so often. Furthermore, when the edge 7 of the float engages the water, there will be an unusual ripple or splash, thus causing the fish to more likely be attracted to the baited hook.

The drawing and description disclose what is now considered to be a preferred form of the invention by way of illustration only, while the broad principle of the invention will be defined by the appended claims.

What I claim is:

1. A float comprising a body approximately circular in cross section having one end concaved, a portion of the body intermediate the ends being of less transverse diameter than the transverse diameter of the concaved end, said body flaring continuously from said portion of the body to the concaved end and terminating in an annular edge whose transverse diameter forms the maximum transverse diameter of the float.

2. A fishing float comprising a body approximately circular in cross section having one end concaved, a portion of the body intermediate the ends being of less transverse diameter than the transverse diameter of the concaved end, said body flaring continuously from said reduced portion of the body to its maximum transverse diameter at the concaved end and a stem extending longitudinally through the body.

3. A fishing float comprising a body approximately circular in cross-section one end of which is rounded off and whose other end is concaved, the concaved end of the float being bell-shaped and terminating in an annular, relatively sharp, edge, the transverse diameter of said edge being greater than the transverse diameter at any other point of the float.

RUPERT D. COCHRAN.